May 6, 1924.

W. ZEDERBOHM 1,493,139

SYSTEM OF CONNECTING BOOSTING TRANSFORMERS

Filed May 18, 1921

Inventor
Wilty Zederbohm
by Knight Bros
Attorneys

Patented May 6, 1924.

1,493,139

UNITED STATES PATENT OFFICE.

WILLY ZEDERBOHM, OF BERLIN-CHARLOTTENBURG, GERMANY, ASSIGNOR TO SIEMENS-SCHUCKERTWERKE, G. M. B. H., OF SIEMENSSTADT, NEAR BERLIN, GERMANY, A CORPORATION OF GERMANY.

SYSTEM OF CONNECTING BOOSTING TRANSFORMERS.

Application filed May 18, 1921. Serial No. 470,706.

*To all whom it may concern:*

Be it known that I, WILLY ZEDERBOHM, a citizen of the German Empire, residing at Berlin-Charlottenburg, Germany, have invented certain new and useful Improvements in Systems of Connecting Boosting Transformers (for which I have filed an application in Germany, May 14th, 1920, Serial No. 53,037 VIII/21 c 2), of which the following is a specification.

Methods are known, wherein the boosting transformer having one winding connected in series with the supply line and the other (exciting) winding connected across the supply line, may be disconnected from the system during working without causing any trouble or interruption. According to these methods a system of switches and switch-contacts is first used to introduce resistance in the exciting circuit and thereafter the inductive voltage drop of the winding connected in series with the line is adjusted to zero. Now the changing-over or disconnection can be effected absolutely without any disturbance. Neither is there any short-circuit in the winding connected in series with the line on closing the circuit lines connected in series with the line so long as there is a considerable amount of energy in the boosting transformer, nor is there any possibility of troubles being created by dangerous voltages induced by this winding in the exciting winding.

My invention relates to a further improvement of this method enabling the use of the boosting transformer for adding to or removing sources of boosting potentials from the line without any disturbance. I effect this by arranging the switches according to the methods mentioned above at both ends of the exciting winding.

In the drawings affixed to this specification and forming part thereof, several modifications of a system embodying my invention as illustrated diagrammatically by way of example.

In the drawings—

Figure 1:
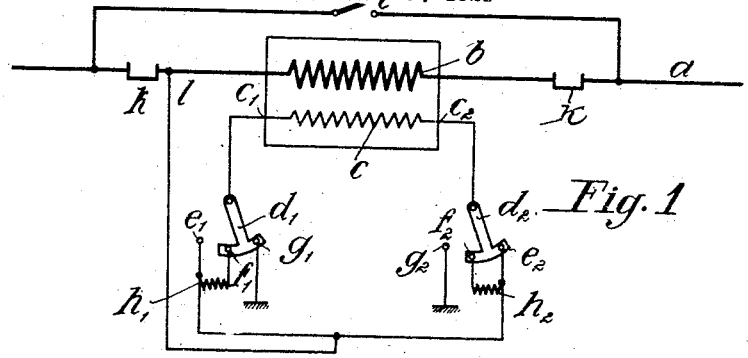
Figure 1 shows an arrangement for a single phase line with a ground return line.

Referring to Fig. 1 $a$ is the supply line, $b$ the secondary winding of the boosting transformer connected in series with the supply line, $c$ the exciting winding of the transformer. To both ends of the exciting winding are connected switching devices $d_1$, $d_2$, which alternately bridge the switch-contacts $e_1$—$f_1$ or $f_1$—$g_1$, and $e_2$—$f_2$ or $f_2$—$g_2$, respectively. Starting from one end-position, in which the boosting transformer is boosting the line potential in one sense, the switch $d_1$ bridges the contact $e_1$, the switch $d_2$ the contact $g_2$. The exciting winding is now connected with its one end $c_1$ to the supply line, with its second end $c_2$ to the return line or to the ground. In order now to regulate the voltage by means of the boosting transformer, the switch $d_1$ first is turned so as to connect the contacts $e_1$—$f_1$ and thereby to bridge, in the first instance, the resistance $h_1$ to be introduced into the exciting circuit. As soon as the switch $d_1$ is moved further and leaves the contact $e_1$, resistance $h_1$ is connected in series with the exciting winding, the intensity of current is reduced and the voltage produced in the boosting transformer is reduced. If the switch $d_1$ is moved further, it bridges also the switch-contacts $f_1$, $g_1$ and connects the end $c_1$ of the exciting winding also to the ground or to the return line, so that the exciting winding is disconnected from the supply line $a$ and is short-circuited on itself. Finally the uni-polar connection to the supply line $a$ over resistance $h_1$ may also be interrupted by disengaging the switch $d_1$ from the contact $f_1$. The inductive voltage drop of the boosting transformer is hereby reduced to zero. The resulting voltage thus obtained is now equal to the original line voltage. In order to connect the boosting transformer in a reverse sense as before in series with the line $a$, the switching device $d_2$ is now actuated. First the contacts $g_2$, $f_2$ are bridged and the exciting-winding thereby remains short-circuited on itself but is connected in uni-polar fashion to the supply line $a$ over the resistance $h_2$. When switch $d_2$ is moved further, the exciting winding is now connected with its end $c_2$ by way of resistance $h_2$ to line $a$. When switch $d_2$ is still further moved resistance $h_2$ is short-circuited and then cut out as soon as the switch $d_2$ rests solely on contact $e_2$. The boosting transformer is now fully excited in the reverse sense, so that its voltage now acts against the line voltage, in case it had a boosting effect in the previous connection.

It is thus possible, as the case may be, to add to or subtract from the line voltage an auxiliary source of potential free from any disturbance, by means of the switching devices connected with the boosting transformer or to short-circuit the boosting transformer in an intermediate position of the switches $d_1$, $d_2$ as described, so that the bridging switch $i$ in line $a$ may be closed and the boosting transformer and its entire switching device be cut out of the supply line $a$ by means of separating switches $k$—$k$.

In the modification illustrated in Fig. 1 a single phase switching device has been disclosed. This switch-arrangement may also be used directly for a multiphase arrangement, provided that the switching device as disclosed in Fig. 1 for one phase, be arranged in this manner for each phase. The contacts $g_1$ and $g_2$, respectively for each phase, are then not grounded, but are connected to each other at each transformer end, thus forming the star point of the three phase exciting winding of the boosting transformer, when they are bridged by the switching device. This arrangement is disclosed in Fig. 2. In this figure only one boosting transformer with is windings $b$ and $c$ is shown, merely so as to indicate its location, whereas in reality in this case each line phase is provided with its individual transformer windings, each winding connected to its booster circuits controlled by the switches $d_1$, $d_2$ as shown.

Figure 2:
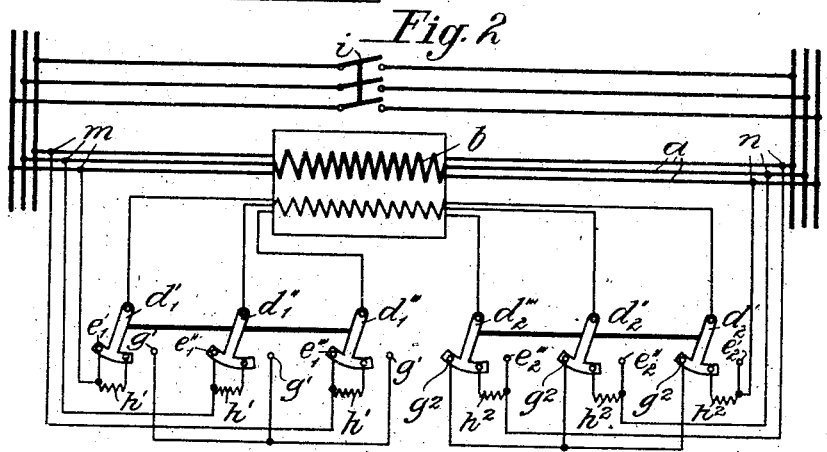
Figure 2 shows a similar arrangement for a three-phase line.

A further difference, immaterial however, in regard to the mode of action, of the arrangement disclosed in Fig. 2 as compared to the arrangement disclosed in Fig. 1 consists in the feature that in the arrangement disclosed in Fig. 1 the exciting winding, no matter in what connection it is used, is connected to a single point $l$ of the supply line, while in the arrangement disclosed in Fig. 2 separate line connections $m$, $n$ are provided for each end of the exciting winding. It is, however, possible, without any further change in the multi-phase arrangement disclosed in Fig. 2, to lead the severally indexed connections $e$ of the switching device to a single line connection. The switching device is operated in the same manner as in the arrangement disclosed in Fig. 1, except that the severally indexed switches $d_1$ and $d_2$ respectively are mechanically connected to operate simultaneously. This arrangement therefore permits of adding or subtracting in the same manner a source of boosting voltage and of cutting out the boosting transformer and its switching arrangement without any disturbance in the supply line.

If the switching devices $d_1$, $d_2$ were to be operated in another sequence as described before, no trouble could arise, since neither is the exciting circuit broken, so long as an inductive voltage drop exists in the winding connected in series to the supply lines, nor can short-circuits occur between the individual line phases or between the windings connected in series with the supply lines, so long as considerable amounts of energy are still stored in the boosting transformer. If, for instance, when regulating in the above described manner, first the switch $d_1$ is adjusted to contacts $e_1$ and subsequently, in order to reverse the potential, the switch $d_2$ is gradually moved from $g_2$ to $e_2$, the exciting winding $c$ for each phase is not short-circuited over the contacts $g_1$, $g_2$, but short-circuited over the respective line connecting line between $e_1$, $e_2$ and the inductive voltage drop is thus reduced to zero. In the arrangement disclosed in Fig. 2 the exciting winding $c$ for each phase is connected to the respective winding $b$ in series with the supply line, whereby the inductive voltage drop of this winding is also reduced to zero and the boosting transformer is thrown out of action.

Figure 3:
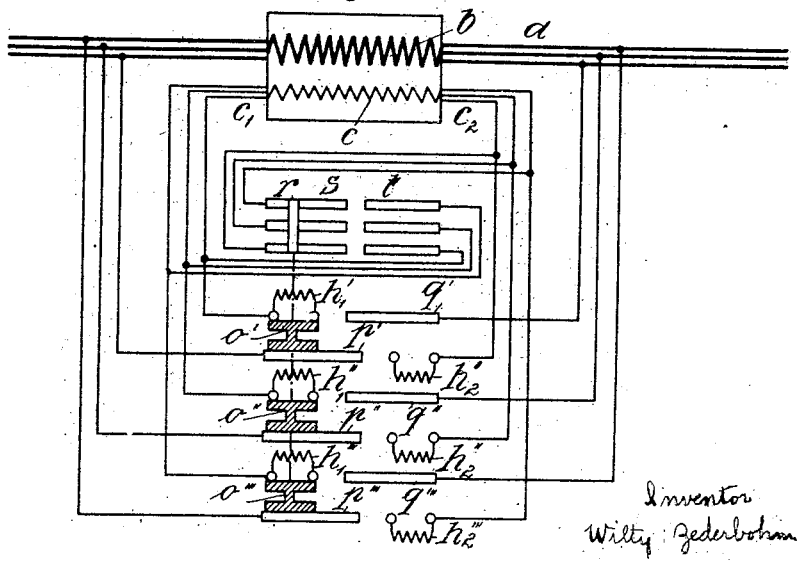
Figure 3 shows a modification of the connections shown in Figure 2.

A further modified arrangement is disclosed in Fig. 3. In this arrangement immediately after throwing the severally indexed resistances $h_1$, $h_2$ into their respective exciting winding by means of the simultaneously movable contacts $o'$, $o''$, $o'''$, each series winding $b$ is short-circuited and thereby its inductive voltage drop entirely destroyed. Short-circuit is effected by means of the contacts $o'$—$o'''$, which simultaneously bridge their respective rails $p'$—$p'''$, $q'$—$q'''$. With the series winding short-circuited it is now possible to change over zero of the exciting winding from the end $c_1$, to the end $c_2$ of each transformer by means of the contact $r$. The winding connected in series with the supply lines now being short-circuited in itself, after its inductive voltage drop is reduced to zero, the changing over of the star point from one winding side to the other may be effected with the exciting windings open, or contact $r$ may be changed over with the exciting winding short-circuited on both sides, the contact $r$ simultaneously bridging the contacts $s$ and $t$.

The arrangement according to the present invention in general permits the adjustment of the voltage in three steps without disturbance in the supply line or lines, and by its aid the number of tapping points in step-up transformers may be reduced by one half. In cases, where the regulation in few steps in sufficient, the arrangement embodying my invention is well suited to replace a transformer with tapping points. A boosting transformer capable of being changed over according to my invention, may also take the place of a three-phase transformer.

I claim:

1. In an arrangement for boosting the voltage of supply lines, a boosting transformer having its secondary winding connected in series with the supply line, and its primary winding connected in parallel to said line, a switch connected to each end of the primary winding, each switch adapted to connect its corresponding end of the primary winding to one of the supply lines and each switch having a plurality of cooperating contacts, the contacts corresponding to the extreme switch position being connected to the respective supply lines, resistances connected at one end to one of the supply lines and at the other end to an intermediate contact of a respective switch, each switch being adapted to bridge two adjacent contacts, said switches in their extreme positions being adapted to short-circuit the primary winding and each switch being adapted to connect the winding and to connect the resistance through the latter to the supply line and to simultaneously open said winding short-circuit and finally to short-circuit and remove said resistance from the circuit while the circuit through the winding remains closed, whereby through the aforesaid operating steps of one switch said primary winding becomes connected in parallel to said supply line in the reverse sense as it is connected by similar operating steps of the other switch.

2. In an arrangement for boosting the voltage of supply lines, a boosting transformer having its secondary winding connected in series with the supply line, and its primary winding connected in parallel to said line, a switch connected to each end of the primary winding, each switch adapted to connect its corresponding end of the primary winding to one of the supply lines and each switch having a plurality of cooperating contacts, the contacts corresponding to the extreme switch position being connected to the respective supply lines, resistances connected at one end to one of the supply lines and at the other end to an intermediate contact of a respective switch, each switch being adapted to bridge two adjacent contacts, said switches in their extreme positions being adapted to short-circuit the primary winding and each switch being adapted to connect the winding and to connect the resistance through the latter to the supply line and to simultaneously open said winding short-circuit and finally to short-circuit and remove said resistance from the circuit while the circuit through the winding remains closed, whereby through the aforesaid operating steps of one switch said primary winding becomes connected in parallel to said supply line in the reverse sense as it is connected by similar operating steps of the other switch, and contacts cooperating with said switches and connected to said secondary winding and adapted to short-circuit said secondary winding on itself after the resistance controlled by one switch is throw in circuit with said primary winding and before the resistance controlled by the other switch is removed therefrom, to permit the short-circuiting of the supply line across the entire booster transformer and across all of the aforementioned switching devices.

3. In an arrangement for boosting the voltage of supply lines, a boosting transformer having its secondary winding connected in series with the supply line, and its primary winding connected in parallel to said line, a switch connected to each end of the primary winding, each switch adapted to connect its corresponding end of the primary winding to one of the supply lines and each switch having a plurality of cooperating contacts, the contacts corresponding to the extreme switch position being connected to the respective supply lines, resistances connected at one end to one of the supply lines and at the other end to an intermediate contact of a respective switch, each switch being adapted to bridge two adjacent contacts, said switches in their extreme positions being adapted to short-circuit the primary winding and each switch being adapted to first insert the resistance at the respective winding end, while the circuit through the winding remains closed, to reduce the inductive voltage drop in the secondary winding to zero, then to disconnect that winding end from the line and to simultaneously short-circuit said winding, the other switch adapted to then connect the other winding end with its pertaining resistance to the supply line and to simultaneously open said winding short-circuit, and finally to short-circuit and remove said latter resistance, while the circuit through said winding remains closed, whereby through aforementioned operating steps of one switch said primary winding becomes thus connected in parallel to said supply line in the reverse sense as it is connected by similar operating steps of the other switch.

In testimony whereof I affix my signature.

WILLY ZEDERBOHM.